(12) United States Patent
White et al.

(10) Patent No.: US 6,915,032 B1
(45) Date of Patent: Jul. 5, 2005

(54) OPTICAL CROSSPOINT SWITCH USING VERTICALLY COUPLED WAVEGUIDE STRUCTURE

(75) Inventors: Ian White, Bath (GB); Richard V. Penty, Bristol (GB); Siyuan Yu, Bristol (GB)

(73) Assignee: University of Bristol, Bristol (GB)

( * ) Notice: Subject to any disclaimer, the term of this patent is extended or adjusted under 35 U.S.C. 154(b) by 0 days.

(21) Appl. No.: 09/937,718
(22) PCT Filed: Mar. 30, 2000
(86) PCT No.: PCT/GB00/01216
§ 371 (c)(1), (2), (4) Date: Apr. 8, 2002
(87) PCT Pub. No.: WO00/58782
PCT Pub. Date: Oct. 5, 2000

(30) Foreign Application Priority Data

Mar. 31, 1999 (GB) ............................... 9907407

(51) Int. Cl.[7] ................................ G02B 6/26
(52) U.S. Cl. .......................... 385/17; 385/18
(58) Field of Search ............................. 385/16–18, 49, 385/50, 132

(56) References Cited

U.S. PATENT DOCUMENTS

| 4,813,757 A |   | 3/1989 | Sakano et al. |  |
|---|---|---|---|---|
| 4,925,264 A |   | 5/1990 | Erman et al. |  |
| 5,013,113 A | * | 5/1991 | Soref | 385/17 |
| 5,859,866 A | * | 1/1999 | Forrest et al. | 372/50 |
| 5,991,475 A |   | 11/1999 | Nelson |  |

FOREIGN PATENT DOCUMENTS

| EP | 0 380 983 A2 | 8/1990 |
|---|---|---|
| EP | 0 401 925 A1 | 12/1990 |
| GB | 2 210 991 A | 6/1989 |

OTHER PUBLICATIONS

Baba et al, "Novel–Integrated–Twin–Guide (ITG) Optical . . . , " IEEE Photonics Technology Letters, vol. 4, No. 5, (1992). May.

Fish et al, "Suppressed Modal Intererence Switches with Integrated Curved . . . ," IEEE Photonics Technology Letters, vol. 10, No. 2, p. 230–232 (1998).

Maciejko et al, "Analysis of an InGaAsP/InP Twin–Overlayed–Waveguide Switch . . . , " IEEE Journal of Quantum Electronics, vol. 30, No. 9, pp. 2106–2113 (1994).

Yu et al, "Ultra–low Crosstalk, Compact Integrated Optical . . . ," XP–002142843. May, 1999.

* cited by examiner

Primary Examiner—Ellen E. Kim
(74) Attorney, Agent, or Firm—Nixon & Vanderhye (57) ABSTRACT

An optical crosspoint switch structure is disclosed. The switch permits light signal to be diverted from any arbitrary number of input ports to any or several of an arbitrary number of output ports. The switch consists of two groups or intercepting optical waveguides formed on a planar substrate, which are the input and output waveguides respectvely. At each intersection another waveguide is formed above the input and output waveguides. Optical coupling between this upper waveguide and the input/output waveguides is controlled by an electrical or optical signal. The upper waveguide has a corner mirror at the intersection. When the control signal allows, light couples from the input waveguide to the upper waveguide. After being reflected by the corner mirror, the light couples from the upper waveguide into the output waveguide. The upper waveguide incorporates the active switching element. Allowing high modulation depth and low crosstalk level.

18 Claims, 6 Drawing Sheets

(a) ON state (b) OFF state

→▶ main signal route
→ stray signal route
---▶ weakened stray signal

OPTICAL CROSSPOINT SWITCH USING VERTICALLY COUPLED WAVEGUIDE STRUCTURE

An optical crosspoint switch structure is disclosed. The switch permits light signals to be diverted from any of arbitrary number of input ports to any or several of an arbitrary number of output ports. The switch consists of two groups of intercepting optical waveguides formed on a planar substrate, which are the input and output waveguides respectively. At each intersection, another waveguide is formed above the input and output waveguides. Optical coupling between this upper waveguide and the input/output waveguides is controlled by an electrical or optical signal. The upper waveguide has a corner mirror at the intersection. When the control signal allows, light couples from the input waveguide to the upper waveguide. After being reflected by the corner mirror, the light couples from the upper waveguide into the output waveguide. The upper waveguide incorporates the active switching element, allowing high modulation depth and low crosstalk level.

1. Field of Invention

The present invention relates to optical components and in particular to an optical crosspoint switch array structure.

2. Description of the Related Art

An optical crosspoint switch array is used in an optical communications system/network to route light signals. It allows light to be diverted from (1) any one of input ports to any one or more output ports (routing), (2) several input ports to an equal or lower number of output ports in an arbitrary order (shuffling or combination), and, (3) any one input port to several output ports (broadcasting). The switch can have an arbitrary number of input and output ports and is designed to be readily scaleable. The realisation of these functions important applications in an optical communications network.

Three main kinds of conventional structures for optical crosspoint switches have been proposed. The first kind splits all optical inputs into a number of branches, as described by Kato, T., et al, in IEICE Trans. On Electronics, Vol.E82C, No.2 pp.305–312, 1999. The number of branches equals the number of outputs. Then it seeks to regroup and recombine these branches. Switching is performed by blocking these branches before recombination. The second kind uses two groups of perpendicular waveguides on a planar substrate as inputs and outputs, respectively. Switching is achieved by constructing couplers in the same plane, as described by Fish, G.A., et al, IEEE Photonics Technology Letters, Vol.10, No.2, pp.230–232, 1998. The third kind also uses two groups of perpendicular waveguides on a planar substrate as inputs and outputs, respectively. Switching is achieved by constructing directional couplers in the vertical direction using only refractive index change as the switching mechanism, as described in "analysis of an InGaAsP/InP twin-overlayed-waveguide switch" by R. Maciejko, A. Champagne, B. Reid, and H Mani, In IEEE Journal of Quantum Electronics, 1994, Vol.30, No.9, pp.2106–2113.

However, the first kind of structure has the disadvantages that it has a high insertion loss proportional to the number of outputs and that it uses large substrate area. The second kind of structure has the disadvantages that it uses large substrate area. The third structure has the disadvantage that high modulation depths and low crosstalk levels are difficult to achieve.

SUMMARY OF THE INVENTION

The object of the present invention is to provide an optical crosspoint switch scheme employing vertical optical coupling with high modulation depth and minimum crosstalk levels between channels.

Another object of the present invention is to provide an optical crosspoint switch occupying a small area per crosspoint (input/output pair).

Still, another object of the present invention is to provide, but not limited to, one particular embodiment of the scheme, which utilises simultaneous refractive index and optical gain changes in the upper waveguide.

Still, another object of the present invention is to make possible, but not to limit to, another particular embodiment of the scheme, which utilises simultaneous refractive index and optical absorption changes in the waveguide coupler.

Figure 1:
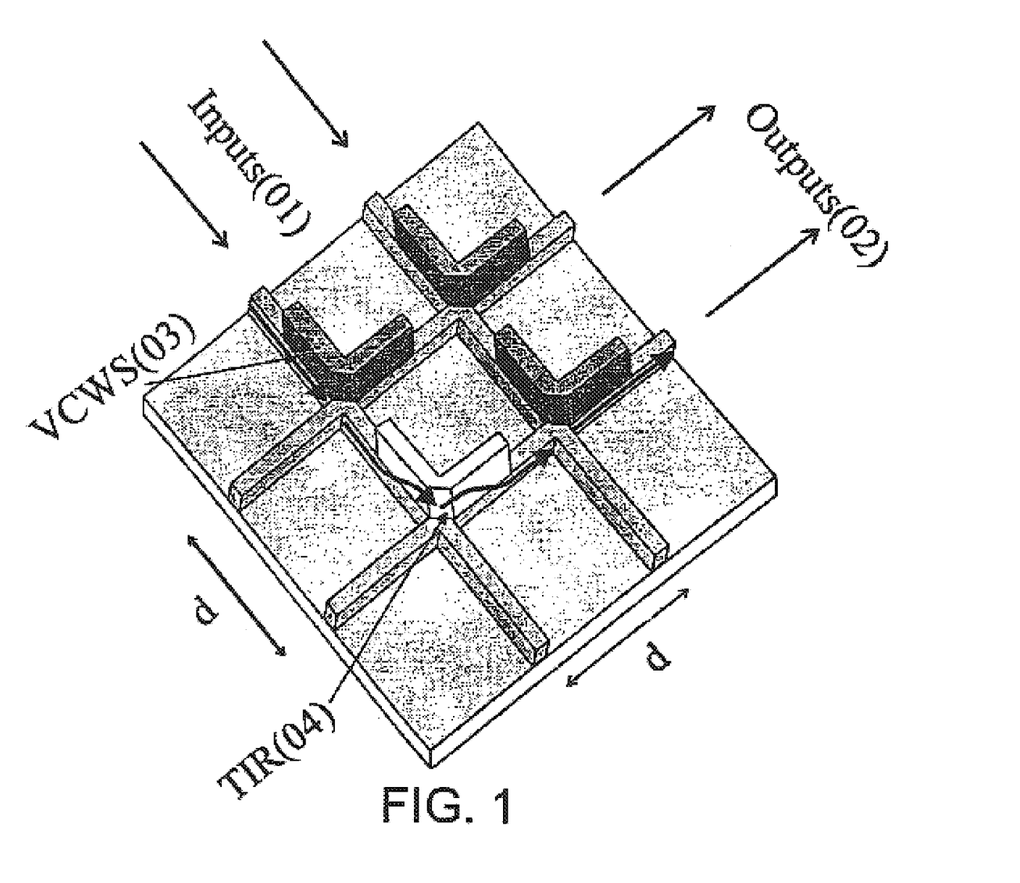
FIG. 1 illustrates the configuration of the optical crosspoint switch array with 2 inputs and 2 outputs, which can be extended to arbitrary numbers of inputs and outputs.

To achieve the object of the invention, as embodied and broadly described herein and illustrated in FIG. 1, two groups of intercepting waveguides, namely the input (01) and the output (02) waveguides, are formed on a planar substrate of an appropriate material. Near each crosspoint, another layer of waveguide is formed above the input and output waveguides, forming a vertically coupled waveguide structure [VCWS(03)]. Vertical optical coupling between this upper waveguide and the lower input/output waveguides is controlled by an electric or optical signal. The upper waveguide has total internal reflection [TIR(04)] corner mirror at the crosspoint. When the control signal selects one particular switch, light couples from the input waveguide to the upper waveguide fully or partially. Reflected by the corner mirror, the light is steered by an angle, then couples from the upper waveguide into the output waveguide. High modulation depth and low crosstalk level are achieved by changing the optical absorption and/or gain in the waveguides synchronously with the switching action.

To achieve another object of the invention, the thickness and the refractive index of the lower layer, the upper waveguide layer and the spacing layer between them are designed so that the coupling length is reduced to the extent that the distance between adjacent ports is decided by the space needed for the input/output optical fibre coupling.

To achieve one particular embodiment of the invention, the lower waveguide, the spacing layer and the upper waveguide layer are consequently formed on a semiconductor substrate suitable for the signal wavelength, to produce a wafer. The bandgap of the lower waveguide is such that it is transparent at the signal wavelength. The bandgap of the upper waveguide is such that it provides high optical absorption when there is no carrier injection, and provides optical gain when there is carrier injection. The propagation constants of the two waveguides are so designed that, when there is no carrier injection, the lower waveguide has smaller propagation constant than the upper waveguide. The doping profile of the layers ensures that most injected carriers are confined in the upper waveguide.

To achieve another particular embodiment of the invention, the lower waveguide, the spacing layer and the upper waveguide layer are consequently formed on a III–V semiconductor substrate suitable for the signal wavelength, to produce a wafer. The bandgap of the lower waveguide is such that it is of low optical loss at the signal wavelength. The bandgap of the upper waveguide is such that it provides high optical absorption when there is applied electric field, and is of low optical loss when there is no applied electric field. The propagation constants of the two waveguides are so designed that, when there is no applied electric field, the two waveguides have equal propagation constants. The doping profile of the layers ensures that electric field will be applied mostly across the upper waveguide.

The objects and advantages of the invention will be set forth in part in the description which follows, and in part will be obvious from the description, or may be learnt by practice of the invention. The objects and advantages of the invention will be realised and attained by means of the elements and combinations particularly pointed out in the appended claims.

BRIEF DESCRIPTION OF THE DRAWINGS

The accompanying drawings illustrate embodiments of the invention and, together with the description, serve to explain the principles of the invention.

DESCRIPTION OF THE PREFERRED EMBODIMENTS

Reference will now be made in detail to the preferred embodiments of the present invention, two examples of which are illustrated in accompanying drawings.

One preferred embodiment of the present invention will be explained hereinafter with references to the accompanying drawings.

Figure 3:
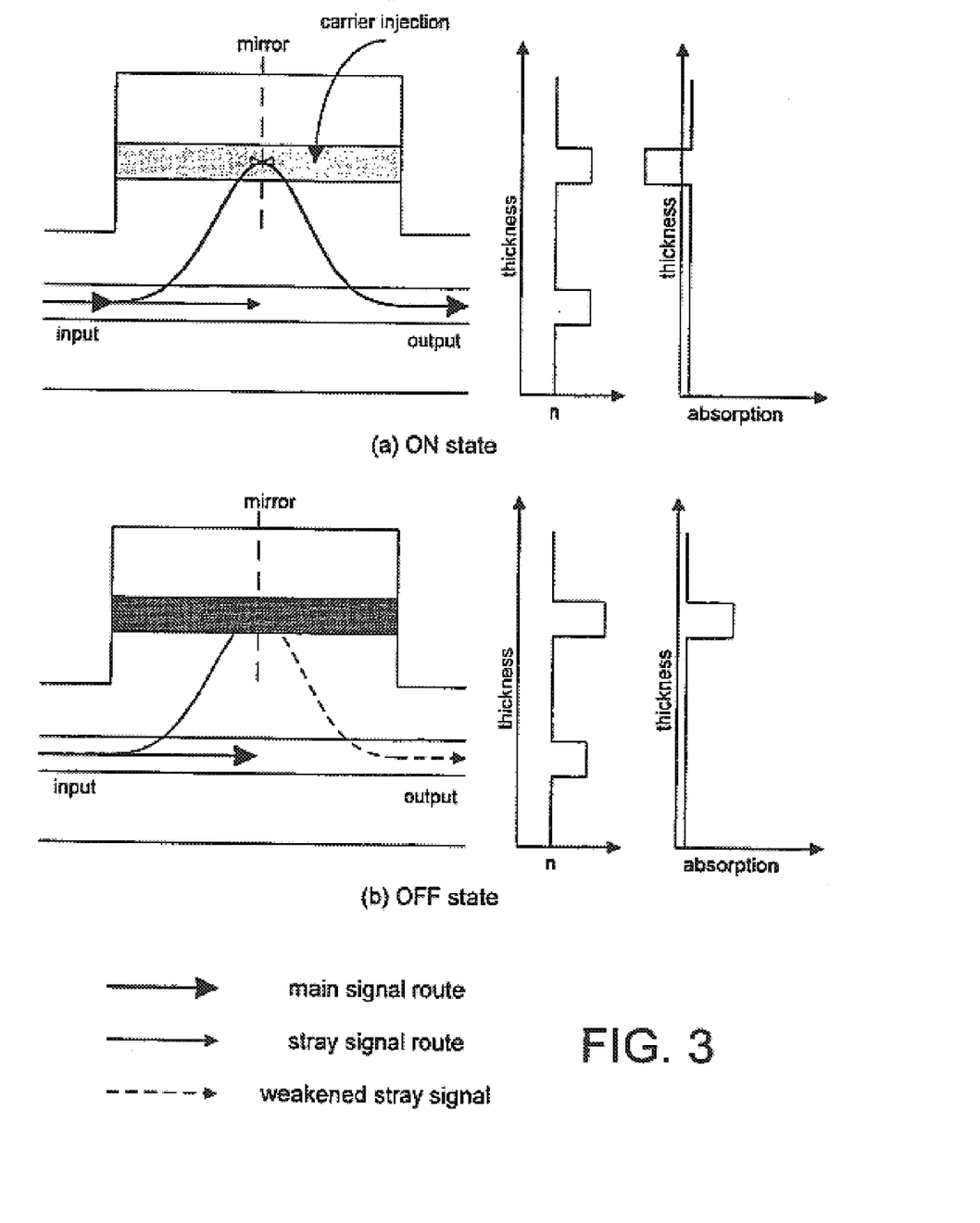
FIGS. 3A and 3B illustrate schematically propagation of the light signal in the first particular embodiment of the invention, with distributions of optical refractive index (n) and absorption in both "ON" and "OFF" states.

At the "ON" state, carriers are injected into, and confined in the upper waveguide of FIG. 3. The upper waveguide may comprise bulk or quantum-well III–V semiconductor material such as InGaAsP, which, at the signal light wavelength, provides optical gain with adequate non-equilibrium carrier concentration but is highly absorptive when there is no such carrier concentration. The refractive index of the upper waveguide at the signal wavelength will be reduced due to the existence of these carriers, causing the reduction of the propagation constant of the upper waveguide to a value close to that of the lower waveguide. As a result, strong optical coupling happens between the two waveguides, enabling the transfer of signal from the lower input waveguide to the upper waveguide, and after reflected by the corner mirror, its transfer from the upper waveguide to the lower output waveguide. At the "OFF" state, there is no injected carrier, the unequal propagation constant of the two waveguide layers reduce optical coupling to a weak extent. In the absence of injected carriers, high optical absorption in the upper waveguide ensures that the weak signal light that does couple into the upper waveguide is absorbed and does not couple into the output waveguide. High modulation depth and low crosstalk level is therefore achieved. This embodiment of the invention has the additional advantage of providing optical gain to compensate for the losses which may occur in the crosspoint switch or other parts of the optical transmission link.

Another preferred embodiment of the present invention will be explained hereinafter with references to the accompanying drawings.

Figure 4:
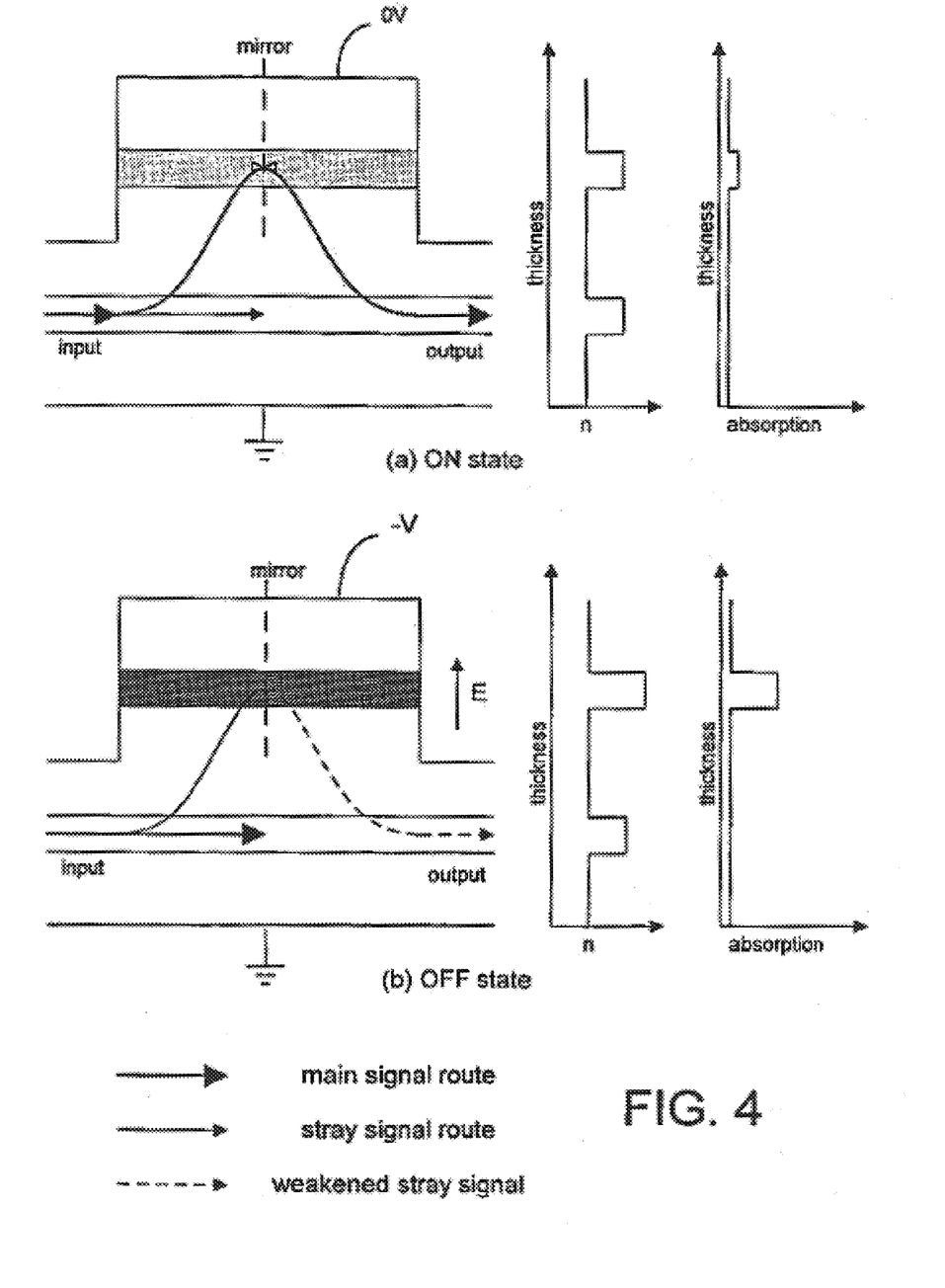
FIGS. 4A and 4B illustrate schematically propagation of the light signal in the second particular embodiment of the invention, with distributions of optical refractive index (n) and absorption in both "ON" and "OFF" states.

At the "ON" state, no electric field is applied across the upper waveguide of FIG. 4. As a result, strong optical coupling happens between the two waveguides because of their equal optical propagation constants, enabling the transfer of signal from the lower input waveguide to the upper waveguide, and after reflected by the corner mirror, its transfer from the upper waveguide to the lower output waveguide. At the "OFF" state, an electric field is applied across the upper waveguide, increasing both its refractive index (therefore its optical propagation constant) and its absorption. The unequal propagation constant of the two waveguide layers reduce optical coupling to a weak extent. The high optical absorption in the upper waveguide ensures that the weak signal light that does couple into the upper waveguide is absorbed and does not couple into the output waveguide. High modulation depth and low crosstalk level is therefore achieved.

Other embodiments of the invention will be apparent to the skilled in the art from consideration of the specification and practice of the invention disclosed herein. It is intended that the specification and examples be considered as exemplary only, with the true scope and spirit of the invention defined by the claims.

Figure 7:
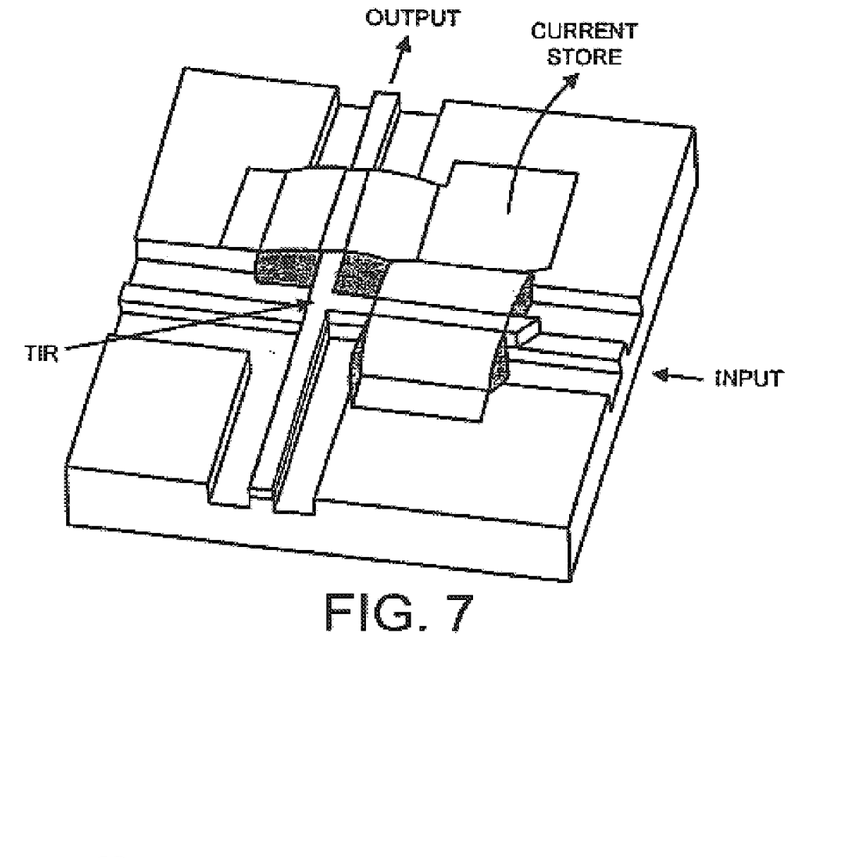
FIG. 7 illustrates a switch unit cell.
Figure 8:
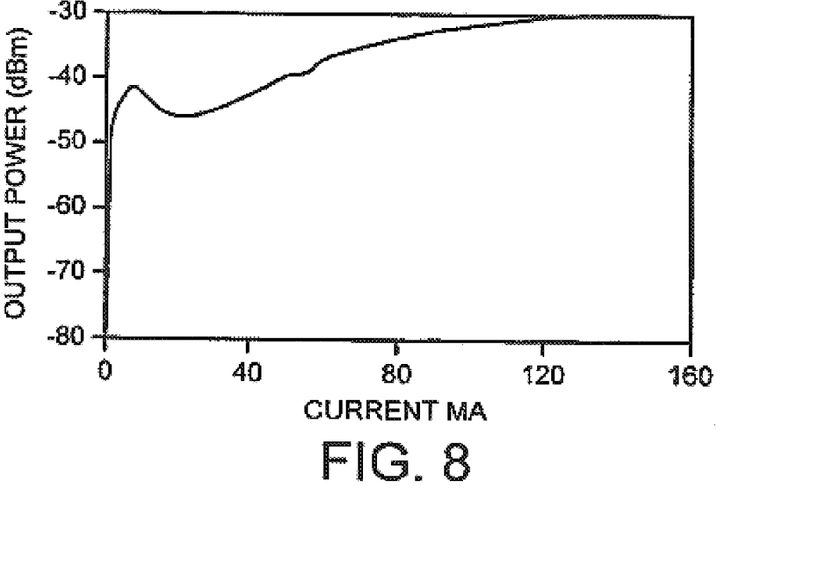
FIG. 8 shows the switching characteristics of the switch unit cell.

An optical crosspoint switch array combining such features as compactness, high speed, and low crosstalk level is highly desirable in high speed all-optical networks. Demonstrated devices based on various guided-wave components so far appear unable to achieve these qualities simultaneously. One kind of crosspoint switches employs MMI couplers to split all optical inputs into a number of branches. Then it seeks to regroup and recombine these branches. Switching is performed by blocking these branches before recombination. This kind of crosspoint switch has a high insertion loss proportional to the number of outputs and uses large substrate area. A second kind of switch uses two groups of perpendicular waveguides on a planar substrate as inputs and outputs, respectively. Switching is achieved by constructing directional couplers in the same plane, as described in. This also uses large substrate area. The present switch structure uses the coupling of light in the vertical direction (normal to the substrate plane, see FIG. 7. to switch any input signal orthogonally to any output (FIG. 8.) Ultra-low crosstalk level at the "OFF" state is achieved by rendering the coupler to a weakened coupling and a high absorption state simultaneously, so that any stray signal is sufficiently attenuated. By careful design, the couplers are made short, allowing the switch to be compact, but tolerant to fabrication variations. The component switch mechanism should allow switching on nanosecond timescales.

DEVICE DESIGN AND FABRICATION

Figure 2:
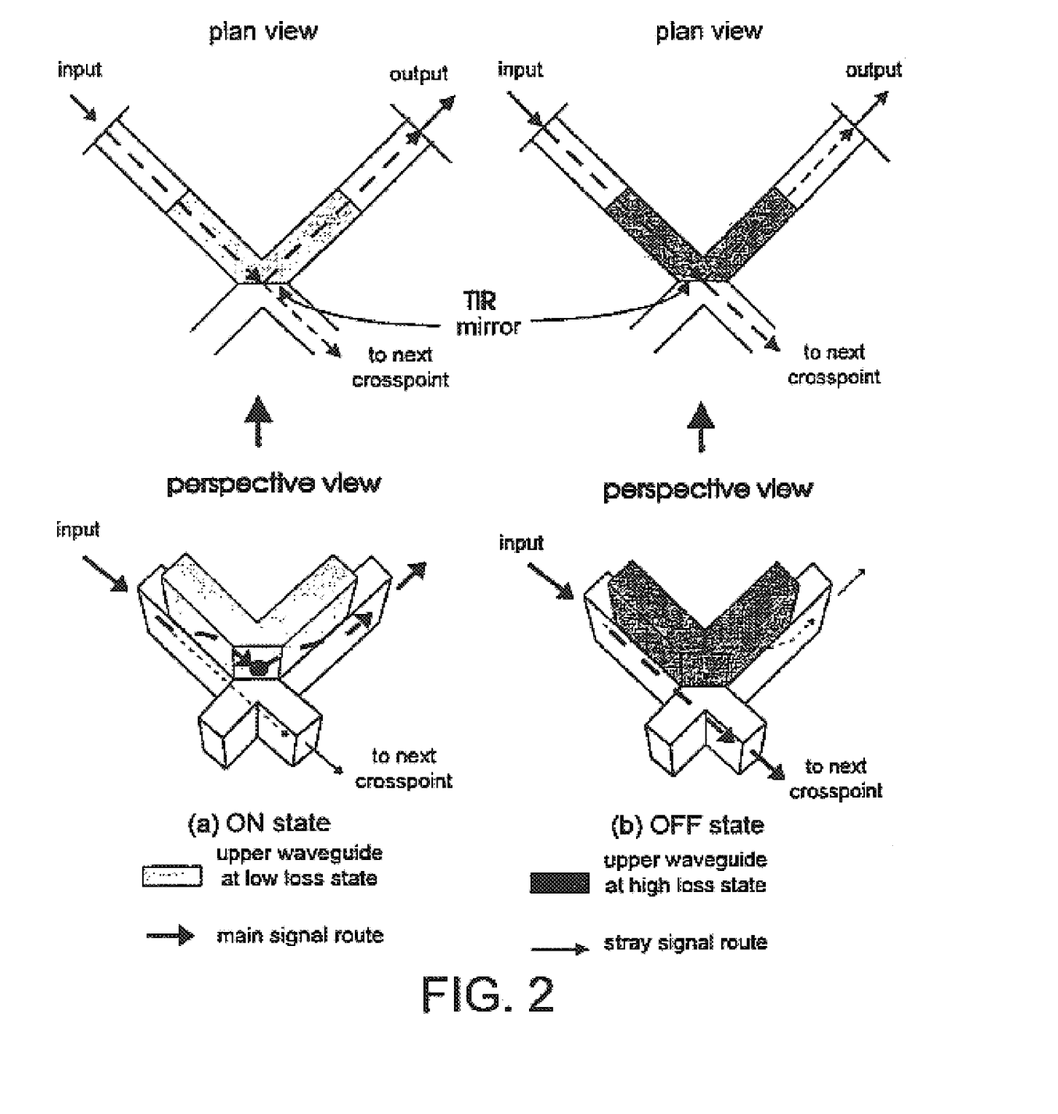
FIGS. 2A and 2B illustrate schematically propagation of the light signal at each cross point with control signal at "on" and "off" states, respectively. A plan (top) view and a perspective view are included in each state.
Figure 5:
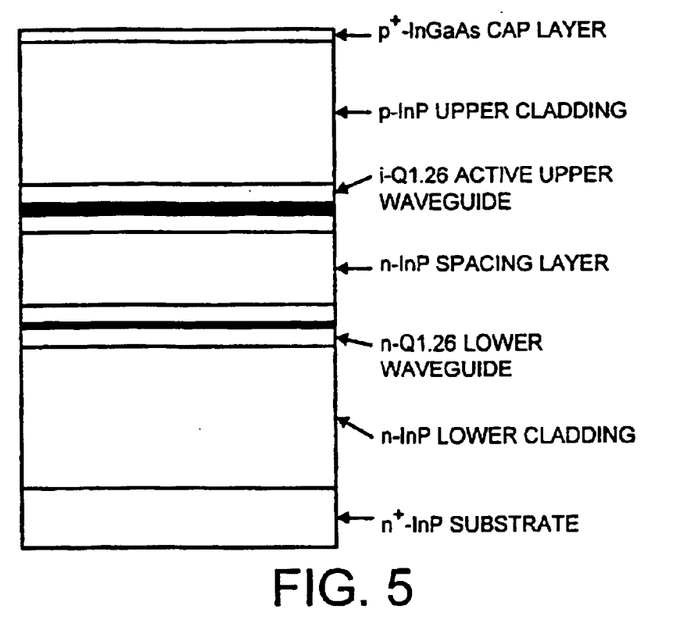
FIG. 5 shows the layer structure of a wafer on which the array is fabricated.
Figure 6:
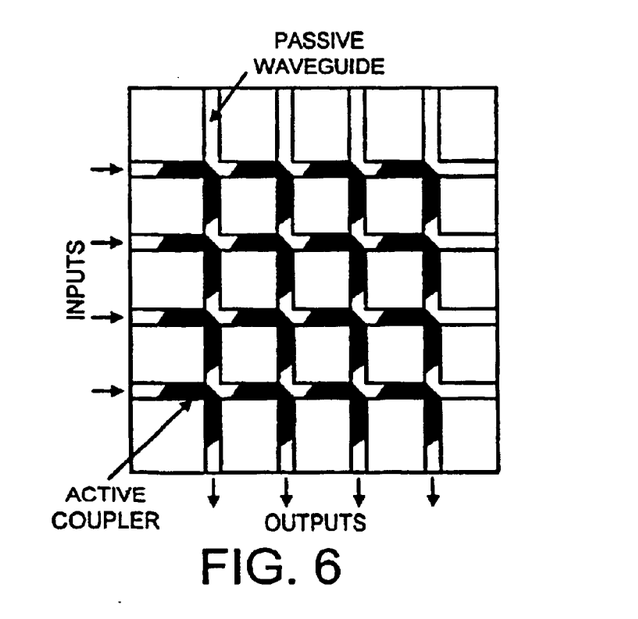
FIG. 6 shows the layout of a 4×4 switch array.

The crosspoint switch array presented here is fabricated on a InGaAsP/InP wafer whose layer structure is illustrated in FIG. 5. It contains two waveguide layers which are grown by MOVPE on (100) InP substrate. The undoped upper waveguide core which contains 5 unstrained 65A InGaAs quantum wells with Q1.26 barriers serves as the active layer at the wavelength of 1550 nm. To control the optical coupling between the two waveguide layers, the effective refractive index of passive lower waveguide core is adjusted to a suitable value lower than that of the active waveguide by incorporating an appropriate number of quantum wells of 37A thick. The passive waveguide has a low absorption for wavelengths of 1500 nm and above. Both waveguide core layers are 0.3 mm thick, separated by a 1.2 mm thick InP spacing layer. The spacing layer and the passive waveguide core are n-doped to $3 \times 10^{17}/cm^3$, as well as the lower InP cladding. The design of this is such that effective switching can be achieved over the entire gain bandwidth of ~50 nm of the active layer. Two perpendicular groups of ridge waveguides are formed on the wafer as input and output waveguides, respectively. The waveguides in each group are 3 mm wide and 250 mm apart. At present 4×4 switch arrays are fabricated (FIG. 2) but it is easy to scale up to any input/output numbers. The upper active waveguide layer is removed from the waveguides except for a 200 mm length extending from the intersections toward both the input and output ports, as illustrated in FIG. 3. Vertical optical directional couplers are formed between these active waveguide layer and the lower passive waveguide layer. A total internal reflection mirror (TIR), the depth of which penetrates the upper waveguide, is formed diagonally cross the waveguide intersection. Switching mechanism is provided by carrier induced refractive index changes in the active upper waveguide of the coupler, which change the coupling length of the vertical coupler [3]. At the "ON" state, the effective refractive index of the active upper waveguide is reduced to equal that of the lower waveguide by the presence of injected carriers, therefore the input optical signal will couple strongly from the passive input waveguide into the upper active waveguide, reflected by the TIR, then couple from the upper waveguide to the output waveguide. The injected carriers also provide optical gain for the signal, therefore contributing the high ON/OFF contrats. Low crosstalk level at the "OFF" state (no carrier injection) is achieved by the combination of much weakened signal coupling into the active upper waveguide and the highly absorptive nature of the active upper waveguide to any residual coupled signal. At the OFF state the input light travels to the next unit cell through the lower passive waveguide. The structure is defined by a reactive ion etching process using $H_2/CH_4$ plasma. A combination of metal and dielectric mask materials are used to facilitate the two-level dry-etching, and to produce smooth and vertical sidewall finish required by the TIR. The depth of the TIR mirror is about halfway between the two waveguide layers. The structure is finished with Polyimide planitization and Ti/Au contacts. The arrays (FIG. 3) are then cleaved from the wafer, allowing 100 mm passive access waveguides at both input and output ports. Individual switches are also cleaved from the arrays for characterisation.

Results

Preliminary characterisation results is presented here for a single switch unit cell. The switch cell has 100 mm input and output passive waveguides, with the input waveguide extending beyond the intersection for 500 mm. An HP8168E tuneable laser source is used to produce input signal in the wavelength range of 1470–1580 nm. The signal is coupled in and out, of the device via fibre lenses. A fibre polarisation controller is used to produce either TE or TM polarised input signal. An optical filter is used to eliminate most of the spontaneous emission from the output signal.

The optimum switching characteristics, plotted in FIG. 8, is achieved at 1=1548 nm (the gain peak wavelength of the active waveguide) with TE input polarisation. It is shown that in the "OFF" state, i.e., when injected current is zero, the measured crosstalk signal level is as low as −79 dBm for an in-fibre input signal power of −5 dBm. Accounting the total loss of about 14 dB including input/output coupling and the optical filter, the on-chip crosstalk is about −60 dB, which to our knowledge is the lowest reported so far. The ON/OFF contrast at 70 mA is as high as 45 dB while an maximum of >50 dB is achieved for injection current of 160 mA.

CONCLUSION

An compact integrated 4×4 optical crosspoint switch array has been fabricated on InGaAsP/InP substrate which employs active vertical couplers to achieve compactness, low crosstalk level and high ON/OFF contrasts. Preliminary results show that the switches can achieve on-chip crosstalk levels as low as −60 dB and a high ON/OFF contrast of greater than 50 dB. The switching time for the device is being tested and is believed to be in the nanosecond range determined by the carrier lifetime. Further results will be presented at the conference.

4×4 optical crosspoint switch arrays based on the first preferred embodiment and the second preferred embodiment have been designed, fabricated and tested. The devices are fabricated on InP substrate. The area of a 4×4 array is only 1.2×1.2 mm, with an distance of 0.25 mm between adjacent input or output waveguides. The crosstalk level at input wavelength of 1548 nm is −60 dB. The modulation depth (ON/OFF contrast) is 50 dB. The fabrication and testing results are described in detail in the appending paper authored by the inventors.

What is claimed is:

1. A method of controlling an optical crosspoint switch which comprises intersecting input and output waveguides forming an intersection, a first upper active waveguide portion which is arranged adjacent to the input waveguide and which extends at least partially along the input waveguide to the intersection, a second upper active waveguide portion which is arranged adjacent to the output waveguide and which extends at least partially along the output waveguide from the intersection, and a corner mirror located at the intersection for coupling light signals from the first upper active waveguide portion to the second upper active waveguide portion wherein both refractive index and optical gain/loss of each active waveqüide portion are changed by application of an electrical signal, the method comprising the steps of:

in an OFF state of the switch, using an electrical signal varying the refractive index profile of the first and second upper active waveguide portion in order to prevent light transfer from occurring between the first and second upper active waveguide portion and the input and output waveguides respectively; and in the OFF state of the switch, using the electrical signal varying the optical gain/loss characteristics of first and second upper active waveguide portions, thereby enhancing the prevention of light transfer between the first and second upper active waveguide portions and the input and output waveguides respectively.

2. A method of controlling an optical crosspoint switch which comprises intersecting input and output active waveguides forming an intersection, a first upper active waveguide portion which is arranged adjacent to the input waveguide and which extends at least partially along the input waveguide to the intersection, a second upper active waveguide portion which is arranged adjacent to the output waveguide and which extends at least partially along the output waveguide from the intersection, and a corner mirror located at the intersection for coupling light signals from the first upper active waveguide portion to the second upper active waveguide portion wherein both refractive index and optical gain/loss of each active waveguide portion are changed by application of an electrical signal, the method comprising the steps of:

in an ON state of the switch, using an electrical signal varying the refractive index profile of the first and second upper active waveguide portions in order to enable light transfer to occur between the first and second upper active waveguide portions and the input and output waveguides respectively; and in the ON state of the switch, using the electrical signal, varying the optical gain/loss characteristics of the first and second upper active waveguide portions, thereby enhancing light transfer between the first and second upper active waveguides and the input and output waveguide portions respectively.

3. An optical crosspoint switch comprising:

intersecting input and output waveguides forming an intersection;

a first upper active waveguide portion arranged adjacent to the input waveguide and extending at least partially along the input waveguide to the intersection;

a second upper active waveguide portion arranged adjacent to the output waveguide and extending at least partially along the output waveguide from the intersection; and a corner mirror located at the intersection for coupling light signals from the first upper active waveguide portion into the second upper active waveguide portion wherein both refractive index and optical gain/loss of each active waveguide portion are changed by application of an electrical signal, said first and second upper active waveguide portions being made of a material having characteristics such that application of an electrical signal thereto causes variation of the optical gain/loss characteristics and refractive index profile thereof.

4. A switch as claimed in claim 3, wherein increases in the electrical signal cause increases in loss of the first and second upper active waveguides.

5. A switch as claimed in claim 3, wherein increases in the electrical signal cause increases in gain of the first and second upper active waveguides.

6. A switch as claimed in claim 3, wherein the input and output waveguides intersect at an angle of substantially 90 degrees.

7. A switch claimed in claim 3, wherein the first and second upper active waveguides are of the same width as the input and output waveguides respectively.

8. A switch as claimed in claim 3, wherein the first and second upper active waveguides are not of the same thickness as the input and output waveguides respectively.

9. A switch structure as claimed in claim 3, wherein the first and second upper active waveguides are of the same thickness as the input and output waveguides respectively.

10. A switch as claimed in claim 3, wherein the axis of the first and second upper waveguides are centered above the axis of the input and output waveguides respectively.

11. A switch as claimed in claim 3, wherein the axis of the first and second upper active waveguides are not centered above the axis of the input and output waveguides respectively.

12. A switch as claimed in claim 3, wherein the first and second upper active waveguides are not of constant width and thickness.

13. A switch as claimed in claim 3, wherein the input and output waveguides are not of constant width and thickness.

14. A switch as claimed in claim 3, formed on a substrate material which is substantially planar.

15. A switch as claimed in claim 3, wherein the upper waveguides are terminated by end facets that are not perpendicular to the active waveguide axis.

16. An array of switches each switch being as claimed in claim 3.

17. An array of switches as claimed in claim 16, wherein the input and output waveguides have tapered ends to enhance coupling between the array and an optical fiber.

18. A switch as claim 3, wherein the input and output waveguides are passive waveguides.

* * * * *